United States Patent [19]
Rabby

[11] Patent Number: 5,642,754
[45] Date of Patent: Jul. 1, 1997

[54] METHOD OF SECURING A VALVE SEAT MEMBER WITHIN A TUBULAR HOUSING AND A BALL VALVE ASSEMBLY

[75] Inventor: Glen Irvin Rabby, Alberta, Canada

[73] Assignee: Hi-Kalibre Equipment Ltd., Edmonton, Canada

[21] Appl. No.: 633,057

[22] Filed: Apr. 16, 1996

[30] Foreign Application Priority Data

Apr. 28, 1995 [CA] Canada .................................. 2148175

[51] Int. Cl.⁶ .......................................................... F16K 5/06
[52] U.S. Cl. ............................ 137/613; 251/316; 251/360
[58] Field of Search ................................. 137/613, 614; 251/314, 315.01, 316, 359, 360, 361, 362, 363

[56] References Cited

U.S. PATENT DOCUMENTS

| | | | |
|---|---|---|---|
| 3,385,313 | 5/1968 | Okada | 251/316 X |
| 3,930,636 | 1/1976 | Pugh | 251/316 X |
| 4,084,608 | 4/1978 | Laignel et al. | 251/159 |
| 5,267,722 | 12/1993 | Coulter | 251/315.01 |
| 5,271,427 | 12/1993 | Berchem | 137/613 X |

*Primary Examiner*—Kevin Lee
*Attorney, Agent, or Firm*—Anthony R. Lambert

[57] ABSTRACT

A method of securing a valve seat member for a ball valve within a tubular housing. Firstly, provide an annular valve seat member and a tubular valve housing. The annular valve seat member has a first face, a second face, an interior surface and an exterior surface. One of the first face and the second face of the annular valve seat member has an arcuate valve seat. The tubular valve housing has an interior surface defining an interior bore. Secondly, position an annular groove in the interior surface of the annular valve seat member and an annular groove in the interior surface of the tubular valve housing. Thirdly, lock the annular valve seat member to the interior surface of the tubular valve housing with a split ring having an exterior surface with a first annular tongue that engage the annular groove of the annular valve seat member and a second annular tongue that engages the annular groove in the interior surface of the tubular valve housing.

8 Claims, 4 Drawing Sheets

METHOD OF SECURING A VALVE SEAT MEMBER WITHIN A TUBULAR HOUSING AND A BALL VALVE ASSEMBLY

FIELD OF THE INVENTION

The present invention relates to a method of securing a valve seat member within a tubular housing and a ball valve assembly constructed in accordance with the teachings of the method.

BACKGROUND OF THE INVENTION

A ball valve generally consists of a ball having an aperture extending therethrough, a first valve seat member positioned on a first side of the ball having a first arcuate valve seat, and a second valve seat member positioned on a second side of the ball having a second arcuate valve seat. When the aperture of the ball is axially aligned with the conduit such the fluid can flow along the conduit through the aperture, the ball valve is said to be in an open position. When the ball is rotated to block the flow of fluid along the conduit, the ball valve is said to be in a closed position. The ball valve assembly includes a valve housing, and means for locking the first valve seat member and the second valve seat member within the valve housing.

When it is necessary to control the flow of fluids through a conduit, a tubular valve housing is incorporated in the conduit. A common means for locking the first valve seat member within the tubular valve housing is to place a shoulder in an interior surface of the tubular valve housing and a corresponding shoulder on the first valve seat member. The first valve seat member is then dropped into place with the shoulder of the first valve seat member engaging the shoulder positioned within the tubular valve housing. The ball is then placed in position on the first arcuate valve seat of the first valve seat member. The second valve seat member is locked in position by placing a first groove and a second groove in the interior surface of the tubular valve housing. The first groove and the second groove mark the position of the first valve seat member. A first split retaining ring is positioned within the first groove, the second valve seat member is placed in position, and then a second split retaining ring is positioned within the second groove. The first valve seat member is confined between the first split retaining ring and the second split retaining ring. An annular retaining ring is usually placed adjacent the second split retaining ring and locked in position by means of a spiral wound retaining ring that is received in a third groove in the interior surface of the tubular valve housing.

The disassembly of the ball valve assembly, as described, requires that the spiral wound retaining ring and the annular retaining ring be removed to allow access to the second split retaining ring. The second split retaining ring can then be removed using a pry bar. The ball is then positioned in an open position and an aluminum bar used to knock the second valve seat member out of the tubular valve housing. Once the second valve seat member is removed the first split retaining ring can then be removed using a pry bar. Once the first split retaining ring has been removed, the ball and the first valve seat member can be knocked out of the tubular valve housing using the aluminum bar.

Problems have been experienced with this type of disassembly with respect to valves used in the oil and gas industry. Through normal use, such valves become encrusted with drilling mud. When the valves are removed and sent for servicing, the mud becomes encrusted on the components of the ball valve assembly making them difficult to remove. The most delicate portion of the disassembly relates to the removal of the second valve seat member. As described above, removal of the second valve seat member requires that an aluminum bar be extended through the aperture in the ball. If great care is not taken the second arcuate valve seat on the second valve seat member can be damaged beyond repair. In many cases it is impossible to dislodge the second valve seat member from the encrusted drilling mud without damaging the second arcuate seat.

SUMMARY OF THE INVENTION

What is required is a form of ball valve assembly that can be disassembled without having to risk damaging a valve seat.

According to one aspect of the present invention there is provided a method of securing a valve seat member for a ball valve within a tubular housing. Firstly, provide an annular valve seat member and a tubular valve housing. The annular valve seat member has a first face, a second face, an interior surface and an exterior surface. One of the first face and the second face of the annular valve seat member has an arcuate valve seat. The tubular valve housing has an interior surface defining an interior bore. Secondly, position female mating means in the interior surface of the annular valve seat member and female mating means in the interior surface of the tubular valve housing. Thirdly, lock the annular valve seat member to the interior surface of the tubular valve housing with a split ring having an exterior surface with first male mating means that engage the female mating means of the annular valve seat member and second male mating means that engages the second female mating means in the interior surface of the tubular valve housing.

Instead of positioning split rings above and below a valve seat member to hold it in place, the teachings of the present invention show how the valve seat member can be held securely in place using a single split ring. One significant advantage of the teachings of this method is that once that single split ring is removed, knocking the valve seat member that was formerly held by the single split ring can be removed by exerting a force with an aluminum bar upon the ball. The valve seat member is removed with the ball. This eliminates the need to exert any force upon in the vicinity of the arcuate valve seat of the valve seat member. Another significant advantage of the teachings of this method is that it enables a dual ball valve assembly to be located within a single tubular valve housing. It is preferred that annular grooves serve as the female mating means and annular tongues serve as the male mating means.

According to another aspect of the present invention there is provided a ball valve assembly that is constructed in accordance with the teachings of the above described method. The ball valve assembly includes a tubular valve housing having a first end, a second end, and an interior surface defining an interior bore. A shoulder projects from the interior surface into the interior bore. Female mating means are positioned in the interior surface spaced from the shoulder. A first valve seat member is provided having a first face, a second face, an interior surface and an exterior surface. The second face has a first arcuate valve seat. The first valve seat member is disposed within the interior bore and engages the shoulder projecting from the interior surface of the tubular valve housing thereby precluding movement of the first valve seat member along the interior bore in a first axial direction toward the first end of the tubular valve housing. The first arcuate valve seat is oriented toward the second end of the tubular valve housing. A ball having an aperture extending therethrough engages the first arcuate valve seat. A second valve seat member is provided having a first face, a second face, an interior surface and an exterior surface. The first face of the second valve seat member has a second arcuate valve seat. The interior surface of the second valve seat member has female mating means. A split ring is provided having an interior surface and an exterior surface. The exterior surface has first male mating means that engage the female mating means of the second annular member and second male mating means that engage the female mating means in the interior surface of the tubular valve housing. Means is provided for locking the split ring in position. Means is provided for rotating the ball.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
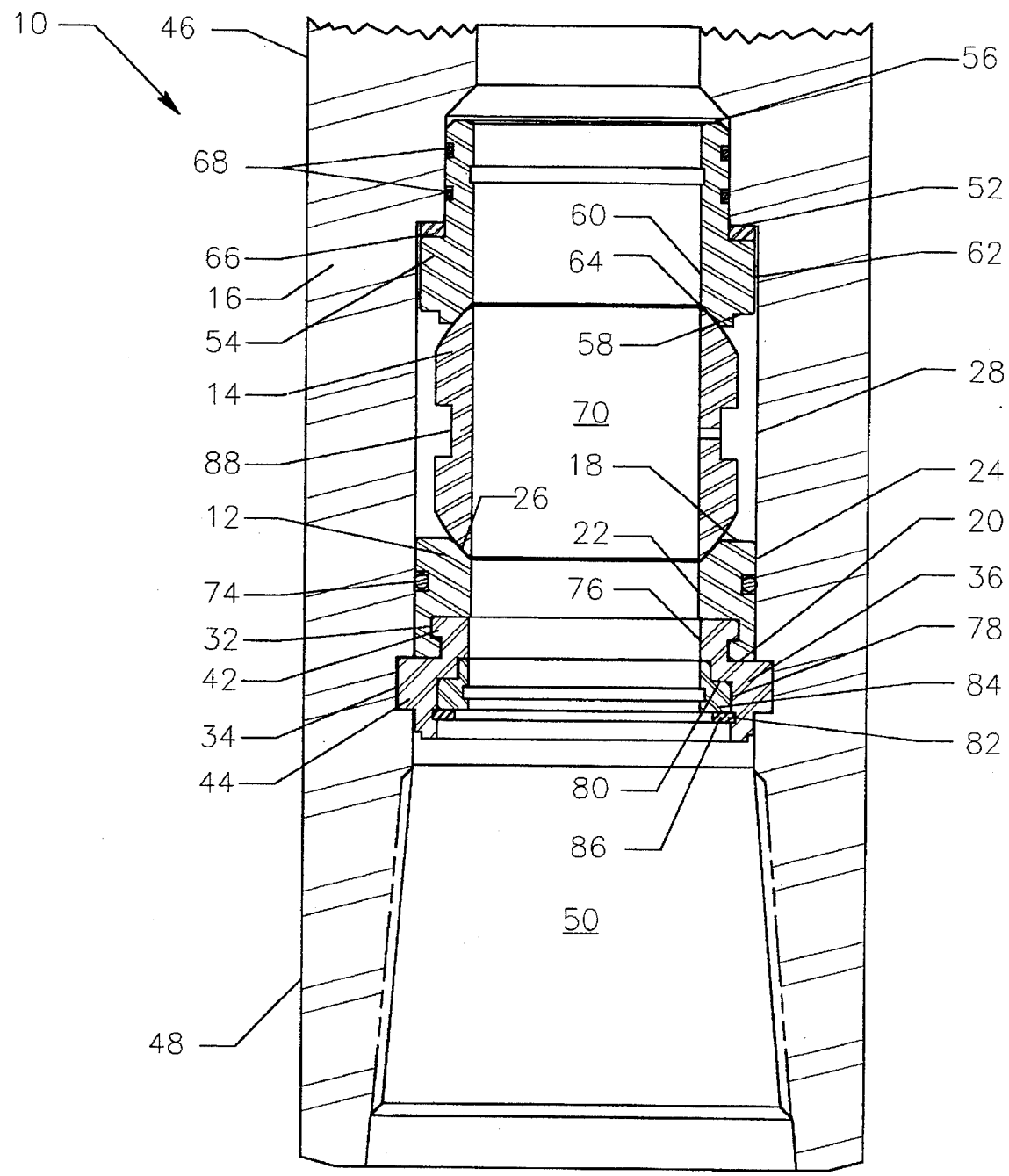
FIG. 1 is a side elevation view in section of a single ball valve assembly constructed in accordance with the teachings of the present invention.
Figure 2:
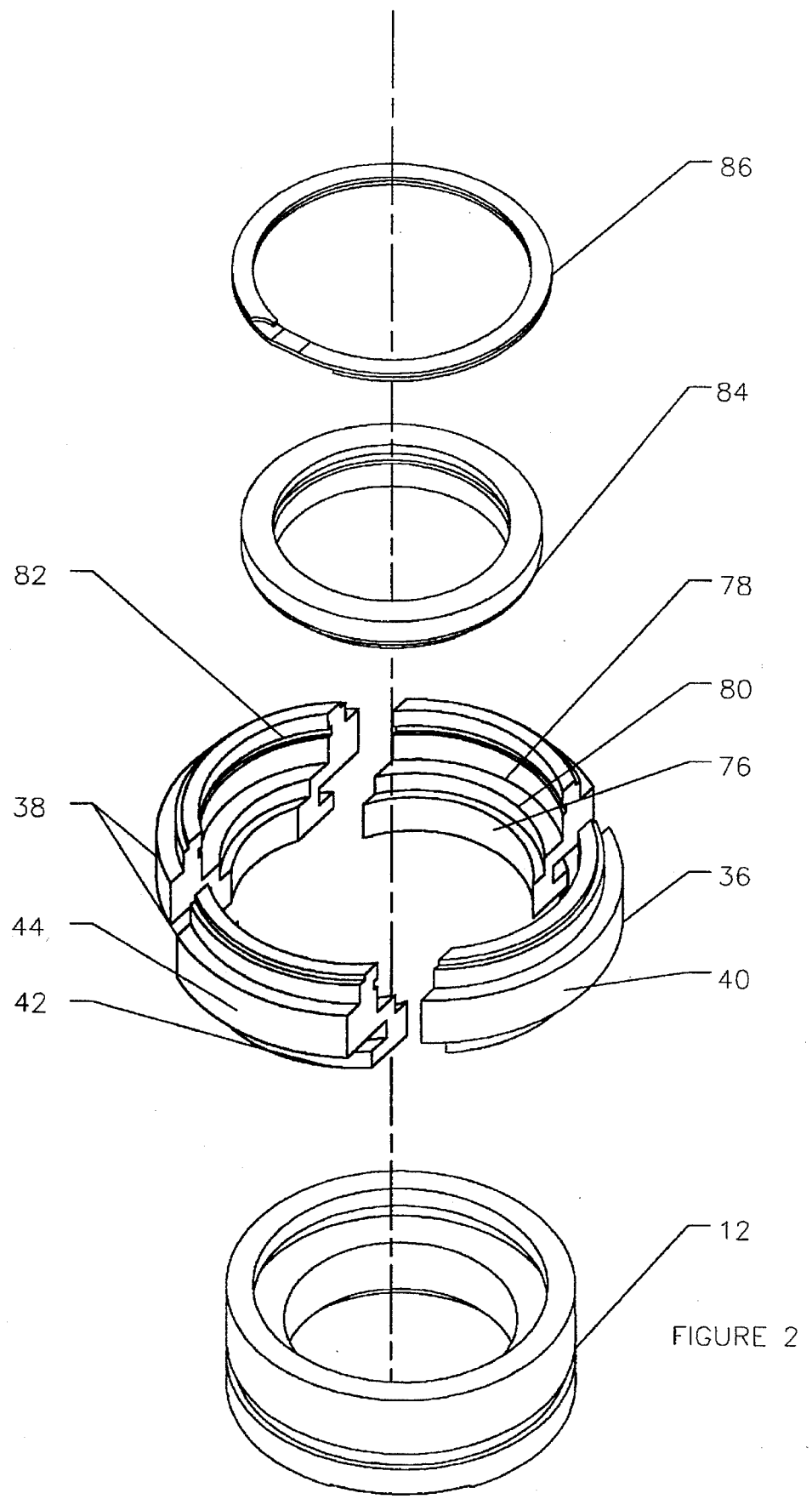
FIG. 2 is an exploded perspective view of a portion of the single ball valve assembly illustrated in FIG. 1.
Figure 3:
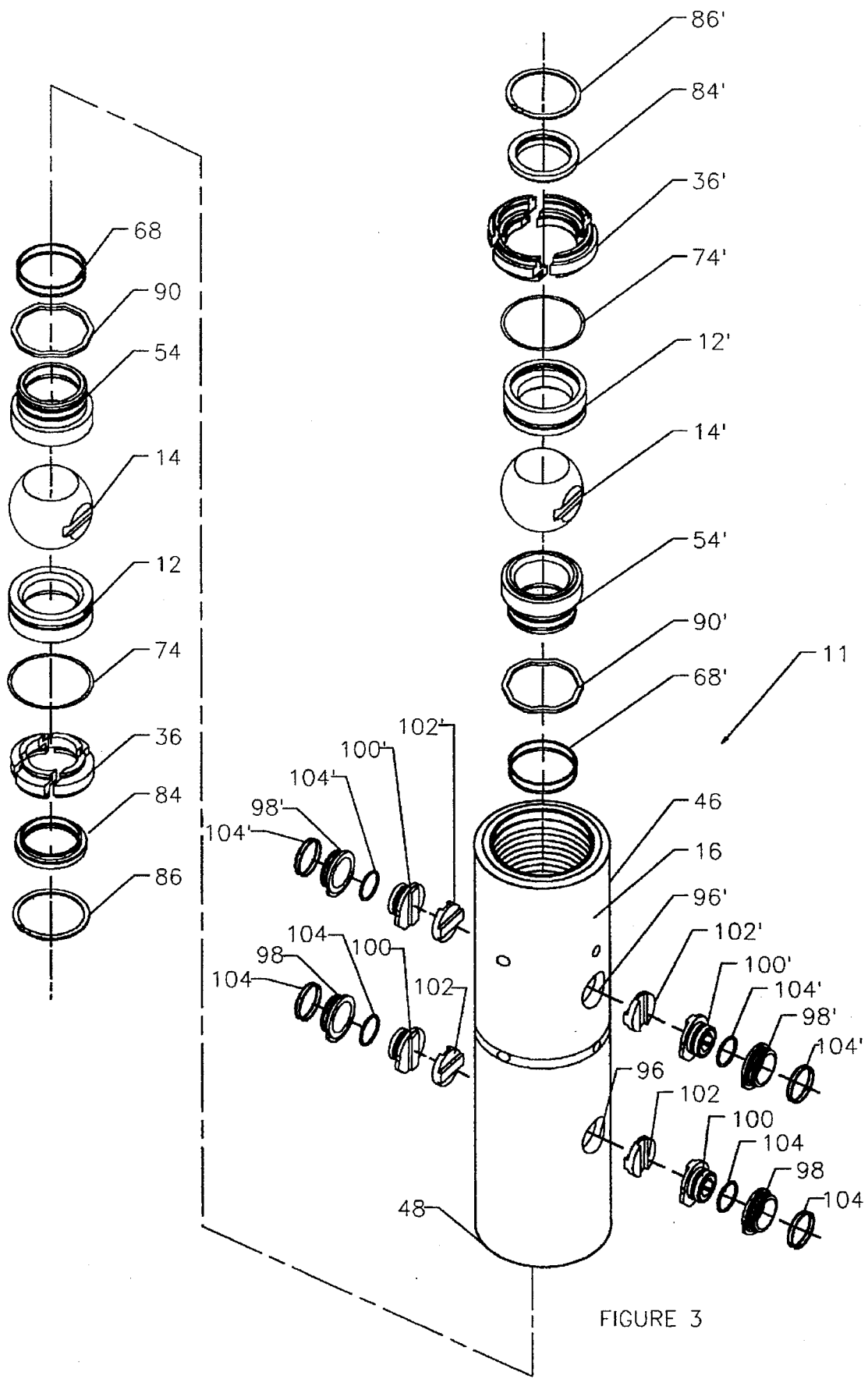
FIG. 3 is an exploded perspective view of a dual ball valve assembly constructed in accordance with the teachings of the present invention.
Figure 4:
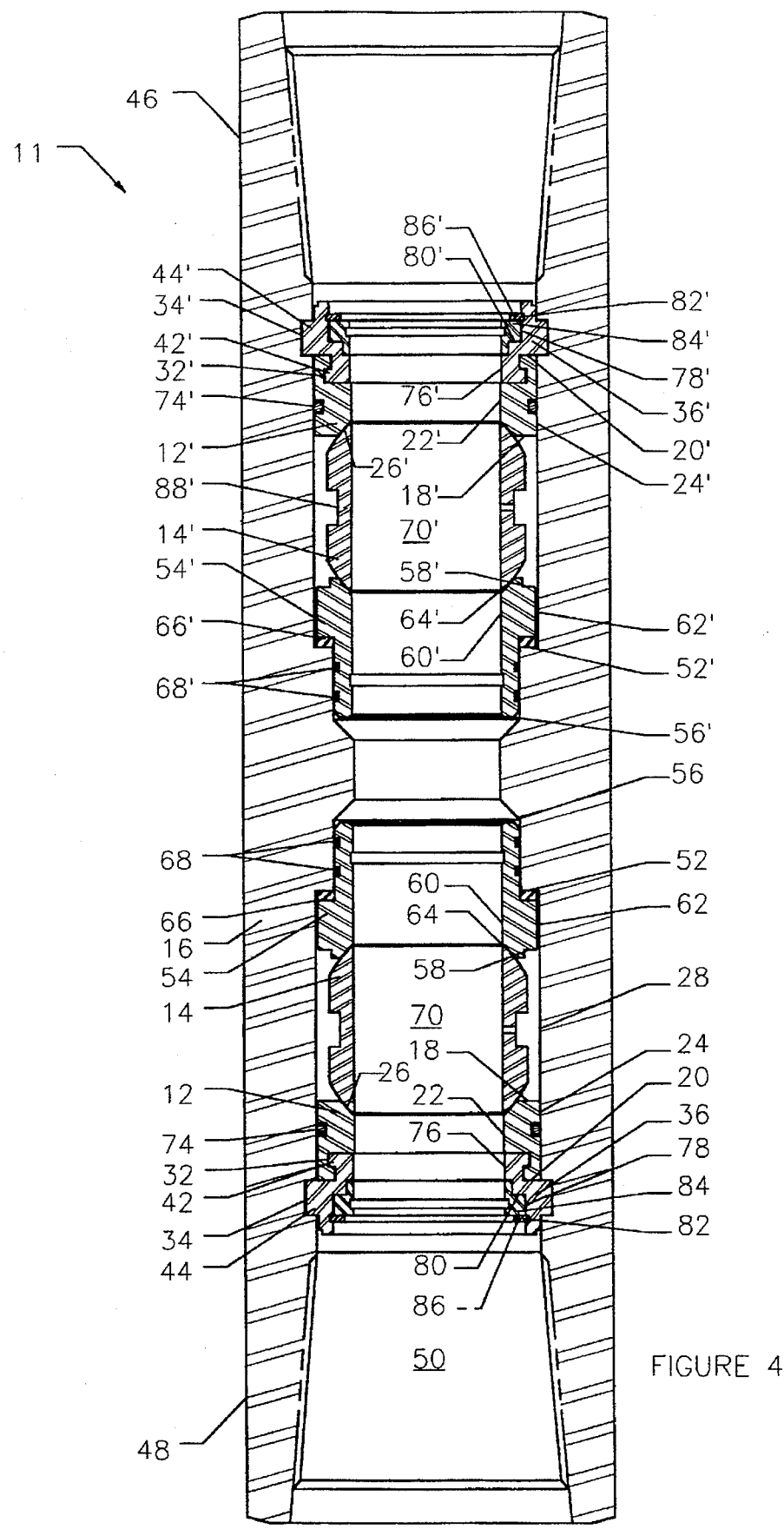
FIG. 4 is a side elevation view in section of the dual ball valve assembly illustrated in FIG. 3.

A preferred method of securing a valve seat member for a ball valve within a tubular housing will now be described with reference to a single ball valve assembly and a dual ball valve assembly generally identified by reference numerals 10 and 11, as illustrated in FIGS. 1 through 4. Single ball valve assembly 10 is illustrated in FIG. 1 and 2. Dual ball valve assembly is illustrated in FIGS. 3 and 4.

Referring to FIG. 1, there is illustrated an annular valve seat member 12, a ball 14, and a tubular housing 16. The preferred method of securing valve seat member 12 within tubular housing 16 consists of the following steps. Firstly, provide annular valve seat member 12 and tubular valve housing 16. Annular valve seat member 12 has a first face 18, a second face 20, an interior surface 22 and an exterior surface 24. One of first face 18 and second face 20 of annular valve seat member 12 has an arcuate valve seat 26. In the illustrated embodiment arcuate valve seat 26 is positioned on first face 18. Tubular valve housing 16 has an interior surface 28. Secondly, position female mating means (here illustrated in the form of an annular groove 32) in interior surface 22 of annular valve seat member 12 and female mating means (here illustrated in the form of an annular groove 34) in interior surface 28 of tubular valve housing 16. Thirdly, locking annular valve seat member 12 to interior surface 28 of tubular valve housing 16 with a split ring 36. It will be noted from a review of FIG. 2, that split ring 36 consists of a plurality of arcuate segments individually identified by reference numeral 38. Referring to FIG. 1, split ring 36 has an exterior surface 40 with first male mating means (here illustrated in the form of an annular tongue or rib 42) that engage the female mating means (annular groove 32) of annular valve seat member 12 and second male mating means (here illustrated in the form of an annular tongue or rib 44) that engages the second female mating means (annular groove 34) in interior surface 28 of tubular valve housing 16.

Referring to FIG. 1, single ball valve assembly 10 will now be described in greater detail. In addition to the details already described, tubular valve housing 16 has a first end 46 and a second end 48. Interior surface 28 defines an interior bore 50. An annular shoulder 52 projects from interior surface 28 into interior bore 50. Annular groove 34 in interior surface 28 are spaced from shoulder 52. There are, of course, two valve seat members that engage ball 14. Valve seat member 12, already identified is a second valve seat member. A first valve seat member 54 is provided that has a first face 56, a second face 58, an interior surface 60 and an exterior surface 62. Second face 58 has a first arcuate valve seat 64. First valve seat member 54 is disposed within interior bore 50 of tubular valve housing 16. A shoulder 66 on exterior surface 62 of first valve seat member 54 engages shoulder 52 that projects from interior surface 28 of tubular valve housing 16 thereby precluding movement of first valve seat member 54 along interior bore 50 in a first axial direction toward first end 46 of tubular valve housing 16. First valve seat member 54 has a pair of annular seals 68 that sealingly engage interior surface 28 of tubular valve housing 16. First arcuate valve seat 64 is oriented toward second end 48 of tubular valve housing 16. Ball 14 has an aperture 70 extending therethrough. Ball 14 engages first arcuate valve seat 64. An annular seal 74 is positioned on exterior surface 24 of first valve seat member 12. First face 18 of second valve seat member 12 has second arcuate valve seat 26. In addition to exterior surface 40, split ring 36 has an interior surface 76. Interior surface 76 has an enlarged diameter portion 78. A shoulder 80 is formed where enlarged diameter portion 78 of interior surface 76 terminates. An annular groove 82 is positioned in enlarged diameter portion 78 spaced from shoulder 80. An annular locking ring 84 is positioned in enlarged diameter portion 78. Annular locking ring 84 serves as means for locking split ring 36 in position as it engages interior surface 76 of split ring 36 to prevent removal of individual arcuate segments 38. A spiral wound retaining ring 86 is positioned in annular groove 82 in enlarged diameter portion 78 to prevent removal of locking ring 84. Ball 14 has an opening 88 that is part of the means used for rotating ball 14. Opening 88 is indirectly coupled to a male actuator member from a valve actuator (not shown) as will be hereinafter further described.

Referring to FIGS. 3 and 4, dual ball valve assembly 11 represents the best mode of putting the teaching of the present method into effect. It is constructed by placing two embodiments of single ball valve assembly 10 back to back in a single tubular housing. One of the two back to back single ball valve assemblies 10 will be identified in FIGS. 3 and 4 by the same reference numerals used in FIGS. 1 and 2; the other of the single ball valve assemblies 10 will be identified by reference numerals followed by ', ie. 10'. Referring to FIG. 4, tubular valve housing 16 is provided with two shoulders and two annular grooves. For the purpose of the description which follows shoulder 52 has been designated as second shoulder 52. Second shoulder 52 projects from interior surface 28 into interior bore 50 spaced from second end 48. In addition to second shoulder 52, a first shoulder 52' is provided that projects from interior surface 28 into interior bore 50 spaced from first end 46. For the purpose of the description, annular groove 34 has been designated as second annular groove 34. Second annular groove 34 is positioned in interior surface 28 spaced from second shoulder 52 toward second end 48 of tubular valve housing 16. In addition to second annular groove 34, a first annular groove 34' is provided in interior surface 28 spaced from first shoulder 52' toward first end 46. A third valve seat member 54' is provided having a first face 56', a second face 58', an interior surface 60' and an exterior surface 62'. Second face 58' has a third arcuate valve seat 64'. Third valve seat member 54' is disposed within interior bore 50. A shoulder 66' on exterior surface 62' of third valve seat member 54' engages first shoulder 52' projecting from interior surface 28 of tubular valve housing 16, thereby precluding movement of third valve seat member 54' along interior bore 50 in a second axial direction toward second end 48 of tubular valve housing 16. Third arcuate valve seat 64' is oriented toward first end 46 of tubular valve housing 16. A second ball 14' is provided having an aperture 70' extending therethrough. Second ball 14' engages third arcuate valve seat 64'. A fourth valve seat member 12' is provided having a first face 18', a second face 20', an interior surface 22' and an exterior surface 24'. First face 18' of fourth valve seat member 12' has a fourth arcuate valve seat 26'. Interior surface 22' of fourth valve seat member 12' has an annular groove 32'. A second split ring 36' is provided having an interior surface 76' and an exterior surface 40'. Exterior surface 40' has a first annular tongue 42' that engages annular groove 32' of fourth valve seat member 12' and a second annular tongue 44' that engage annular groove 34' in interior surface 28 of tubular valve housing 14. Interior surface 76' has an enlarged diameter portion 78'. A shoulder 80' is formed where enlarged diameter portion 78' of interior surface 76' terminates. An annular groove 82' is positioned in enlarged diameter portion 78' spaced from shoulder 80'. An annular locking ring 84' is positioned in enlarged diameter portion 78'. Annular locking ring 84' serves as means for locking split ring 36' in position as it engages interior surface 76' of split ring 36' to prevent removal of individual arcuate segments 38'. A spiral wound retaining ring 86' is positioned in annular groove 82' in enlarged diameter portion 78' to prevent removal of locking ring 84'. Ball 14' has an opening 88' that is part of the means used for rotating ball 14'. There are some components illustrated in FIG. 3 that have not been previously described. Wave springs 90 and 90' are disposed between valve seat members 54 and 54', respectively, and shoulders 52 and 52'. Tubular valve housing 16 has apertures 96 and 96' extending therethrough to receive male valve actuators (not shown). The components that connect with the male valve actuators include a female stem insert 98 and 98', a slave stem connector 100 and 100', and a U-joint connector 102 and 102'. U-joint connector 102 engages opening 88 in ball valve 14. When a male actuator member (not shown) is inserted into female stem insert 98, an indirect coupling of the male actuator member and ball valve 14 is achieved. In addition, there are O ring seals 104 and 104' disposed between those components.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of securing a valve seat member for a ball valve within a tubular housing, comprising the steps of:

firstly, providing an annular valve seat member having a first face, a second face, an interior surface and an exterior surface, one of the first face and the second face of the annular valve seat member having an arcuate valve seat; and a tubular valve housing having an interior surface defining an interior bore;

secondly, positioning female mating means in the interior surface of the annular valve seat member and female mating means in the interior surface of the tubular valve housing; and thirdly, locking the annular valve seat member to the interior surface of the tubular valve housing with a split ring having an exterior surface with first male mating means that engage the female mating means of the annular valve seat member and second male mating means that engages the second female mating means in the interior surface of the tubular valve housing.

2. The method as defined in claim 1, having annular grooves serve as the female mating means.

3. The method as defined in claim 1, having annular tongues serve as the male mating means.

4. A ball valve assembly, comprising:

a tubular valve housing having a first end, a second end, an interior surface defining an interior bore, a shoulder that projects from the interior surface into the interior bore, and female mating means in the interior surface spaced from the shoulder;

a first valve seat member having a first face, a second face, an interior surface and an exterior surface, the second face having a first arcuate valve seat, the first valve seat member being disposed within the interior bore and engaging the shoulder projecting from the interior surface of the tubular valve housing thereby precluding movement of the first valve seat member along the interior bore in a first axial direction toward the first end of the tubular valve housing, the first arcuate valve seat being oriented toward the second end of the tubular valve housing;

a ball having an aperture extending therethrough engaging the first arcuate valve seat;

a second valve seat member having a first face, a second face, an interior surface and an exterior surface, the first face of the second valve seat member having a second arcuate valve seat, the interior surface of the second valve seat member having female mating means;

a split ring having an interior surface and an exterior surface, the exterior surface having first male mating means that engage the female mating means of the second annular member and second male mating means that engage the female mating means in the interior surface of the tubular valve housing;

means for locking the split ring in position; and means for rotating the ball.

5. A ball valve assembly, comprising:

a tubular valve housing having a first end, a second end, an interior surface defining an interior bore, a shoulder that projects from the interior surface into the interior bore, and a annular groove in the interior surface spaced from the shoulder;

a first valve seat member having a first face, a second face, an interior surface and an exterior surface, the second face having a first arcuate valve seat, the first valve seat member being disposed within the interior bore, the first valve seat member having a projecting shoulder that engages the shoulder projecting from the interior surface of the tubular valve housing thereby precluding movement of the first valve seat member along the interior bore in a first axial direction toward the first end of the tubular valve housing, the first arcuate valve seat being oriented toward the second end of the tubular valve housing;

a ball having an aperture extending therethrough engaging the first arcuate valve seat;

a second valve seat member having a first face, a second face, an interior surface and an exterior surface, the first face of the second valve seat member having a second arcuate valve seat, the interior surface of the second valve seat member having an annular groove;

a split ring having a plurality of arcuate segments, the split ring having an interior surface and an exterior surface, the exterior surface having a first annular tongue that engages the annular groove of the second annular member and a second annular tongue that engages the annular groove in the interior surface of the tubular valve housing;

means for locking the split ring in position; and means for rotating the ball.

6. The ball valve assembly as defined in claim 1, wherein the interior surface has an enlarged diameter portion, a shoulder being formed where the enlarged diameter of the interior surface terminates, an annular groove being positioned in the enlarged diameter portion spaced from the shoulder; an annular locking ring being positioned in the enlarged diameter portion, the annular locking ring engaging the interior surface of the split ring to prevent removal of the arcuate segments; a spiral wound retaining ring being positioned in the annular groove in the enlarged diameter portion to prevent removal of the locking ring.

7. A dual ball valve assembly, comprising:

a tubular valve housing having a first end, a second end, an interior surface defining an interior bore, a first shoulder that projects from the interior surface into the interior bore spaced from the first end, a second shoulder that projects from the interior surface into the interior bore spaced from the second end, first female mating means in the interior surface spaced from the first shoulder toward the first end and second female mating means in the interior surface spaced from the second shoulder toward the second end;

a first valve seat member having a first face, a second face, an interior surface and an exterior surface, the second face having a first arcuate valve seat, the first valve seat member being disposed within the interior bore and engaging the second shoulder projecting from the interior surface of the tubular valve housing thereby precluding movement of the first valve seat member along the interior bore in a first axial direction toward the first end of the tubular valve housing, the first arcuate valve seat being oriented toward the second end of the tubular valve housing;

a first ball having an aperture extending therethrough engaging the first arcuate valve seat;

a second valve seat member having a first face, a second face, an interior surface and an exterior surface, the first face of the second valve seat member having a second arcuate valve seat, the interior surface of the second valve seat member having female mating means;

a first split ring having an interior surface and an exterior surface, the exterior surface having first male mating means that engage the female mating means of the second valve seat member and second male mating means that engage the second female mating means in the interior surface of the tubular valve housing;

means for locking the first split ring in position; and means for rotating the first ball;

a third valve seat member having a first face, a second face, an interior surface and an exterior surface, the second face having a third arcuate valve seat, the third valve seat member being disposed within the interior bore and engaging the first shoulder projecting from the interior surface of the tubular valve housing thereby precluding movement of the third valve seat member along the interior bore in a second axial direction toward the second end of the tubular valve housing, the third arcuate valve seat being oriented toward the first end of the tubular valve housing;

a second ball having an aperture extending therethrough engaging the third arcuate valve seat;

a fourth valve seat member having a first face, a second face, an interior surface and an exterior surface, the first face of the fourth valve seat member having a fourth arcuate valve seat, the interior surface of the fourth valve seat member having female mating means;

a second split ring having an interior surface and an exterior surface, the exterior surface having first male mating means that engage the female mating means of the fourth valve seat member and second male mating means that engage the first female mating means in the interior surface of the tubular valve housing;

means for locking the second split ring in position; and means for rotating the second ball.

8. A ball valve and seat assembly comprising:

a ball valve body having a hollow bore;

a ball valve rotatably mounted within the hollow bore;

first and second valve seats disposed within the valve body on opposed sides of the ball valve, the ball valve being rotatably seated on the valve seats;

the first valve seat being secured against movement in a first axial direction along the bore of the valve body;

the second valve seat including an interior annular groove;

a valve body annular grove in the valve body adjacent the second valve seat; and a split ring having first and second annular ribs, the first annular rib mating with the interior annular groove and the second annular rib mating with the valve body annular groove.

* * * * *